United States Patent [19]

Meissner

[11] Patent Number: 5,182,983
[45] Date of Patent: Feb. 2, 1993

[54] PEACH PITTER BLADE ASSEMBLY

[75] Inventor: Konrad E. Meissner, Lafayette, Calif.

[73] Assignee: Atlas Pacific Engineering Company, Pueblo, Colo.

[21] Appl. No.: 912,537

[22] Filed: Jul. 13, 1992

[51] Int. Cl.$^5$ .............................. A23N 4/04; A23N 4/22
[52] U.S. Cl. ........................................ 99/486; 99/551; 99/553; 99/554
[58] Field of Search ................. 99/485, 486, 489–491, 99/544–547, 551–554, 562, 563; 426/485, 484

[56] References Cited

U.S. PATENT DOCUMENTS

| | | | |
|---|---|---|---|
| 3,695,322 | 10/1972 | Anderson et al. | 99/562 |
| 3,878,309 | 4/1975 | Anderson et al. | 426/485 |
| 4,109,570 | 8/1978 | Silvestrini | 99/551 |
| 4,122,765 | 10/1978 | Silvestrini | 99/554 |
| 4,158,993 | 6/1979 | Spence | 99/486 |
| 4,168,658 | 9/1979 | Silvestrini | 99/551 |
| 4,206,697 | 6/1980 | Meissner | 99/489 |
| 4,213,382 | 7/1980 | Meissner | 99/486 |
| 4,254,701 | 3/1981 | Anderson et al. | 99/554 |
| 4,380,953 | 4/1983 | Anderson et al. | 99/549 |
| 4,486,454 | 12/1984 | Erb | 99/553 |

Primary Examiner—Timothy F. Simone

[57] ABSTRACT

A blade assembly for a selective peach pitter using simplified construction and a low-maintenance geometry to provide for extended operational efficiency and compensation for play due to wear in the components. The blade assembly includes an upper blade and a lower blade for bisecting a drupe along a suture plane and holding the pit during pitting, the upper blade and lower blade both being pivoted about a common blade pivot shaft and driven by a single main shaft from the larger pitter assembly. The lower blade pivot linkage includes an extendable crank arm drivingly coupled to an idler arm, drive arm support shaft and lower blade drive arm, the lower blade drive arm including a rocker face and a drive roller which respectively engage a rolling rocker face follower and a roller-drive track located on a carriage coupled to the lower blade and pivotally mounted on the blade pivot shaft. As the drive roller enters and traverses the roller drive track, rotational force of the lower blade drive arm in one direction is translated to pivotable motion of the lower blade between closed and open positions. As the drive arm rotates in the opposite direction, the lower blade is pivoted to the closed position and the rocker face engagement with the rocker face follower maintains the lower blade in that position during pitting. The upper blade also alternates between an open and closed position as a cam roller follower coupled to the upper blade follows a cam mounted on the main shaft of the pitter apparatus.

12 Claims, 4 Drawing Sheets

PEACH PITTER BLADE ASSEMBLY

BACKGROUND OF THE INVENTION

The invention generally relates to a pitter for pitting drupes, such as clingstone peaches, apricots, or the like. More specifically, the invention relates to an improved mechanical blade assembly for a selective drupe pitter particularly adapted for pitting clingstone peaches.

Various mechanical drupe pitting devices have been developed for selectively responding to the wide range of drupe conditions. With many drupes, specifically with clingstone peaches, different methods of pitting are used depending upon the condition of the pit. When the peach has a sound pit, pitting may be accomplished using a "torque" type pitter. Such a device bisects the flesh of the peach using a pair of generally opposing blades converging upon the pit. When the blades reach the pit, the pit is gripped at its opposite sides and the peach halves are twisted or torqued in opposite directions by adjacent jaws to separate the peach halves from the held pit. The pitted halves and the pits then drop out of the assembly and a new peach is introduced to begin the cycle anew.

When the peach pit is unsound, for example a split, cracked or otherwise damaged pit, conventional torque-type pitting assemblies are ineffective because the blades will travel through the pit rather than gripping it as required for torque-type separation from the peach halves. As a result, when a pit is unsound the blades can often bisect the entire peach including the pit. Obviously, this result is unsatisfactory. Spoon pitting techniques are employed when the particular pit is unsound. Spoon pitting uses a curved blade normally confined within the plane of one of the peach bisecting blades to spoon out the unsound pit and thereby separate the pit from the peach flesh. Until recently, torque-type pitting and spoon pitting were accomplished using separate devices which significantly decreased pitting efficiency.

Advanced devices have been developed which allow selective torque-type pitting and spoon pitting using the same device. Such a device is disclosed in U.S. Pat. No. 4,158,993 issued Jun. 26, 1979. This type of selective peach pitter automatically torque-pits clingstone peaches having sound pits, spoon-pits clingstone peaches having split or defective pits and bisects clingstone peaches having "late" split pits without requiring modification to the device or interrupting the pitting cycle.

Selective pitting devices conventionally suffer from high maintenance requirements due to the large number of moving parts and rapid operating speeds. Blade assemblies for selective pitting devices particularly suffer from gradual wear in the linkage operating the movement of the upper and lower blades. Excessive wear leads to play in the operational linkage causing loss of grip on the peach pit reduction of pitting efficiency, and ultimately incomplete pit removal from the peach. Existing blade assemblies employ numerous pivot points, each having bushings or bearings prone to excessive wear and corrosion when subject to inadequate lubrication. It is not uncommon for selective peach pitting devices to operate at machine speeds of 60 to 75 cycles per minute. At this operation speed and during long operating cycles, the device must be closely monitored for wear and preventative maintenance. For typical maintenance, replacement and relubrication, the entire blade assembly must be removed from the machine for in-season repair of bearings, cam followers, springs, etc. Annual after-season overhauls also require removal of the blade assembly from the machine for replacement of worn out parts and sharpening, etc.

It is highly desirable, therefore, to minimize wear of blade assemblies in an effort to reduce or eliminate in-season maintenance and replacement and minimize time and expense required for after-season overhaul without compromising pitter production and capacity.

SUMMARY OF THE INVENTION

The present invention is a drop blade assembly for use in a selective peach pitter apparatus similar to the selective pitter disclosed in U.S. Pat. No. 4,158,993 to Spence, issued Jun. 26, 1979.

The blade assembly of this invention includes a pivoting upper blade and pivoting lower blade coupled to a frame, the mechanical movement driven by a singular motorized main shaft of the greater pitter apparatus. A cam secured to the main shaft drives the pivoting sequence of the upper blade. A crank arm, coupled to the bottom of the main shaft, drives the pivoting movement of the lower blade. The crank arm is coupled to the bottom of the shaft at a position offset from the rotational axis of the shaft. As such, shaft rotation causes translational movement of the crank arm which is communicated to additional lower blade pivot linkage including an idler arm secured to a drive arm support shaft. The main shaft rotation thereby produces reciprocating motion transferred through the crank arm to the lower blade idler arm, through the drive arm support shaft and to a lower blade drive arm. The lower blade drive arm includes a semicircular rocker face and drive roller. With each cycle of the main shaft, the lower blade drive arm swings in a back and forth motion causing the semicircular rocker face to engage and travel along a rolling rocker face follower coupled to the lower blade through a lower blade carriage and carriage arm. The lower blade carriage includes a drive roller track which, upon engagement by the drive roller, causes the lower blade carriage arm to rotate upon a blade pivot shaft, first rotating the lower blade downwardly away from the upper blade and then forwardly where it is retained in the upper, closed position for a dwell period. During this dwell period, the peach pit is gripped between the upper and lower blades allowing the torque pitting or spooning operation to be completed.

Simultaneously with the movement of the lower blade, the cam secured to the main shaft drives a cam roller follower producing a reciprocating motion of the upper blade about the blade pivot shaft. A spring biases the cam roller follower against the cam and the upper blade towards the lower blade, while providing resilient compression against a peach pit of various dimensions between the upper and lower blades when both are in a closed position.

The geometry of the cam driven upper blade and crank arm driven lower blade effectively reduces wear on the pit gripping blade mechanism.

The lower blade and upper blade pivot about a common pivot shaft thereby reducing the number of pivot wear points significantly from prior art devices. Because of the mechanical construction of the design and the geometry of elements used, wear in the blade drive is not directly translated into undesirable blade movement during the pitting action of the cycle. As a result, there is no loss of pitting efficiency during a normal peach canning season due to wear. Further, there is no need for oil or grease lubrication; existing water and juice spray on the device is sufficient. The reduction of wear points relative to the prior art and absence of corroding surfaces also significantly reduce after-season overhaul expense and complexity. As the lower blade is adjustably mounted, it can sustain a longer operational life than prior art devices with occasional blade teeth sharpening, thereby extending the useful life of the lower blade for many years.

The geometry of the design also provides a more open construction than prior art devices, producing further efficiency in less time-consuming cleaning during daily wash down maintenance of the machine. These and other features and advantages of the invention will become more apparent from the detailed description provided below in conjunction with the drawings appended hereto.

DESCRIPTION OF THE PREFERRED EMBODIMENT

Blade assembly 2 is intended for use with a selective peach pitter apparatus that will torque pit clingstone peaches having sound pits upon the pit being gripped and the halves of the peach body rotated, will bisect clingstone peaches having "late" split pits and will spoon pit clingstone peaches having split pits upon peaches being indiscriminately fed into the pitter apparatus. Such a device is disclosed in U.S. Pat. No. 4,158,993 to Spence, issued Jun. 26, 1979. The inventive blade assembly described below can be adapted to for use in such a selective peach pitter apparatus or derivations thereof.

Figure 1:
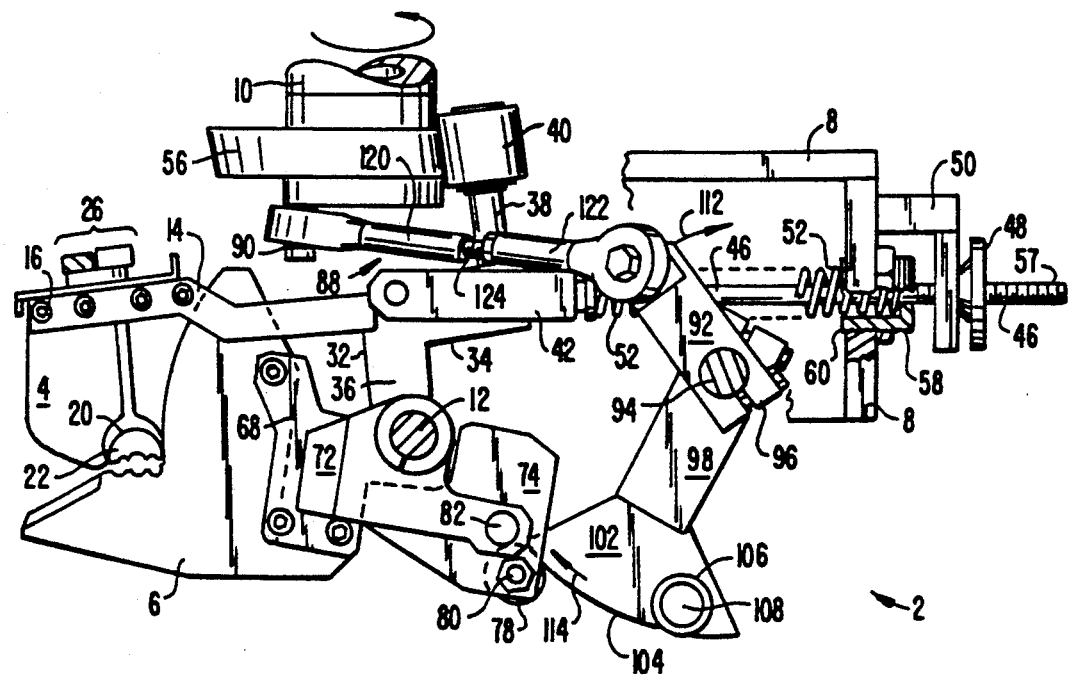
FIG. 1 is a side elevational view of a blade assembly and associated structure embodying the invention, illustrating the upper and lower blades respectively in the second and fourth or closed positions.
Figure 4:
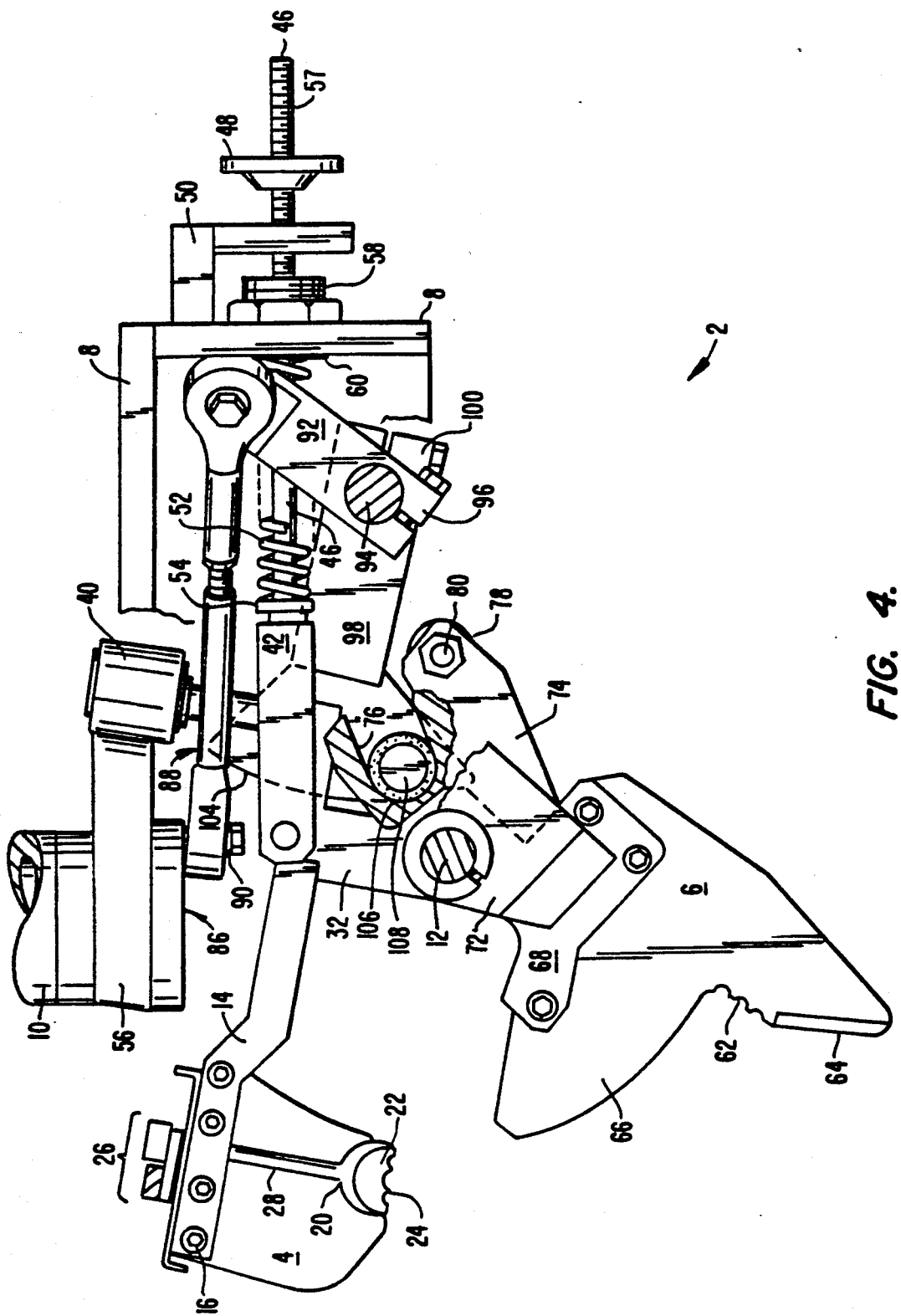
FIG. 4 is a side elevational view of the blade assembly of FIG. 1, illustrating the upper and lower blades respectively in the first and third or open positions.

The preferred embodiment of the invention is illustrated in FIG. 1 with upper blade 4 and lower blade 6 in the closed position. For purposes of description, the "closed position" refers to blade position as illustrated in FIG. 1 and the "open position" refers to blade position as illustrated in FIG. 4. Blade assembly 2 is suspended from a selective peach pitter (not shown) and secured thereto by frame 8. Upper blade 4 and lower blade 6 are driven from main shaft 10 of the peach pitter apparatus and is rotationally driven by a suitable motor. Upper blade 4 communicates with main shaft 10 through upper blade pivot linkage and lower blade 6 is coupled with main shaft 10 through lower blade pivot linkage as is more fully described below. Upper blade 4 and lower blade 6 each move between an upper and lower position along a suture plane. As such, upper blade 4 and lower blade 6 are coplanar and each pivot about blade pivot or support shaft 12 to bisect a drupe introduced into blade assembly 2 by an appropriate feed cup (not shown). Use of a common blade pivot or support shaft for pivotal support of both upper 4 and lower blade 6 significantly reduces component wear and simplifies maintenance. Although blade assembly 2 can be configured for a wide range of drupes, the description below is presented for adaption to a peach pitter for brevity only.

Upper blade 4 is removably connected to upper blade bracket 14 using fasteners 16 such as bolts or the like. In the preferred embodiment, upper blade 4 includes downwardly opening recess 18 (FIG. 3) housing a rotatable spoon 20 and spade 22. Spade 22 includes a pit engaging portion having teeth 24 for gripping a drupe pit. Spoon 20 and spade 22 are controlled for spoon pitting through selective spoon pitting mechanism 26 coupled to the necessary linkage in a selective peach pitter apparatus.

The term "spoon pitting" is commonly used in the industry to differentiate from torque pitting wherein the peach pits are sheared, or torn, from peach halves. In torque pitting, a sound peach pit is gripped and the peach flesh bisected into two halves. Jaws (not shown) grip the two outer surfaces of the halves of the drupe and rotate them oppositely about a common axis through 360°, or in some devices 270°, of rotation to shear the halves of the drupe from the pit. In spoon pitting, spoon 20 embraces the peach pit and rotates about stem 28 in the plane of blade 4. Leading edges (relative to the direction of rotation) of the legs 30 of spoon 20 are sharpened to provide knives to cut the peach flesh adjacent the pit as the jaws of the pitter apparatus (not shown) engage the peach flesh and rotate each half about an axis transverse to the blades 4, 6 thereby separating the pit from the peach. Both the pit and the peach halves are then allowed to fall away to make room for the next incoming peach.

Upper blade bracket 14 is secured to upper blade arm 32 (FIGS. 1, 3) which is rotationally mounted onto blade pivot shaft 12. Upper blade arm 32 is generally constructed having angled legs 34, 36. Leg 34 is connected to follower post 38 having cam roller follower 40 rotatably mounted thereon. Also pivotally attached to upper blade arm 32 is upper blade brace 42. Upper blade brace 42 is generally U-shaped (see FIG. 2) and straddles upper blade arm 32 allowing pivoting movement between upper blade arm 32 and upper blade brace 42 at both sides of upper blade arm 32 about upper blade arm pivot 44. Upper blade brace 42 is connected to rod 46 which extends through tension adjuster 58 and is threadably anchored by position adjuster 48. Spring 52 is disposed between upper blade brace 42 at spring seat 54 and tension adjuster 58. Spring 52 biases upper blade brace 42 away from tension adjuster 58 and thereby biases upper blade arm 32 in the same direction. Spring 52 is preferably a coil spring, but alternative resilient members could be used.

As previously described, upper blade arm is pivotally mounted on blade pivot shaft 12. Spring 52 biases cam roller follower 40 against cam 56 mounted on main shaft 10 and biases upper blade 4 towards the closed position. Position adjuster 48, is threadably engaged on rod 46 along threads 57 and acts as an adjustable stop against the biasing force of spring 52. The biasing force of spring 52 causes cam roller follower 40 to follow cam 56 as main shaft 10 rotates, except during passage of the low dwell section of cam 56 past cam roller follower 40. During that period of the cam rotation, position adjuster 48 rests against bracket 50 to keep cam roller follower from touching cam 56 by a distance of approximately 1/32 of an inch. The shape of cam 56 delineates the pivoting movement of upper blade 4 with each revolution, or "cycle", of main shaft 10 as described below.

Lower blade 6 is also driven by main shaft 10 but through a lower blade pivot linkage coupling main shaft 10 to lower blade 6. Lower blade 6 includes pit gripping portion 62 (FIGS. 3, 4), sharpened edge 64 and back blade 66. Lower blade 6 is removably mounted on lower blade bracket 68 using suitable fasteners 70. Lower blade bracket 68 is secured to lower blade carriage arm 72 which is pivotally mounted on blade pivot shaft 12. Carriage 74 is mounted on lower blade carriage arm 72 and includes guide roller track 76. Rolling rocker face follower 78 is disposed on carriage 74 adjacent guide roller track 76. Rolling rocker face follower 78 is mounted on carriage 74 with bolt 80 or other suitable fastener allowing roller rocker face follower 78 to rotate relative to carriage 74. Carriage 74 is removably mounted to lower blade carriage arm 72 with bolt 82 (FIG. 1) to allow disassembly and replacement when required. This structure allows lower blade 6, lower blade carriage arm 72, and carriage 74 to pivot about blade pivot shaft 12 as an integral unit when assembled. The remaining components of the lower blade pivot linkage communicate rotational movement of main shaft 10 to a desired pivoting motion of lower blade 6 about blade pivot shaft 12.

Figure 3:
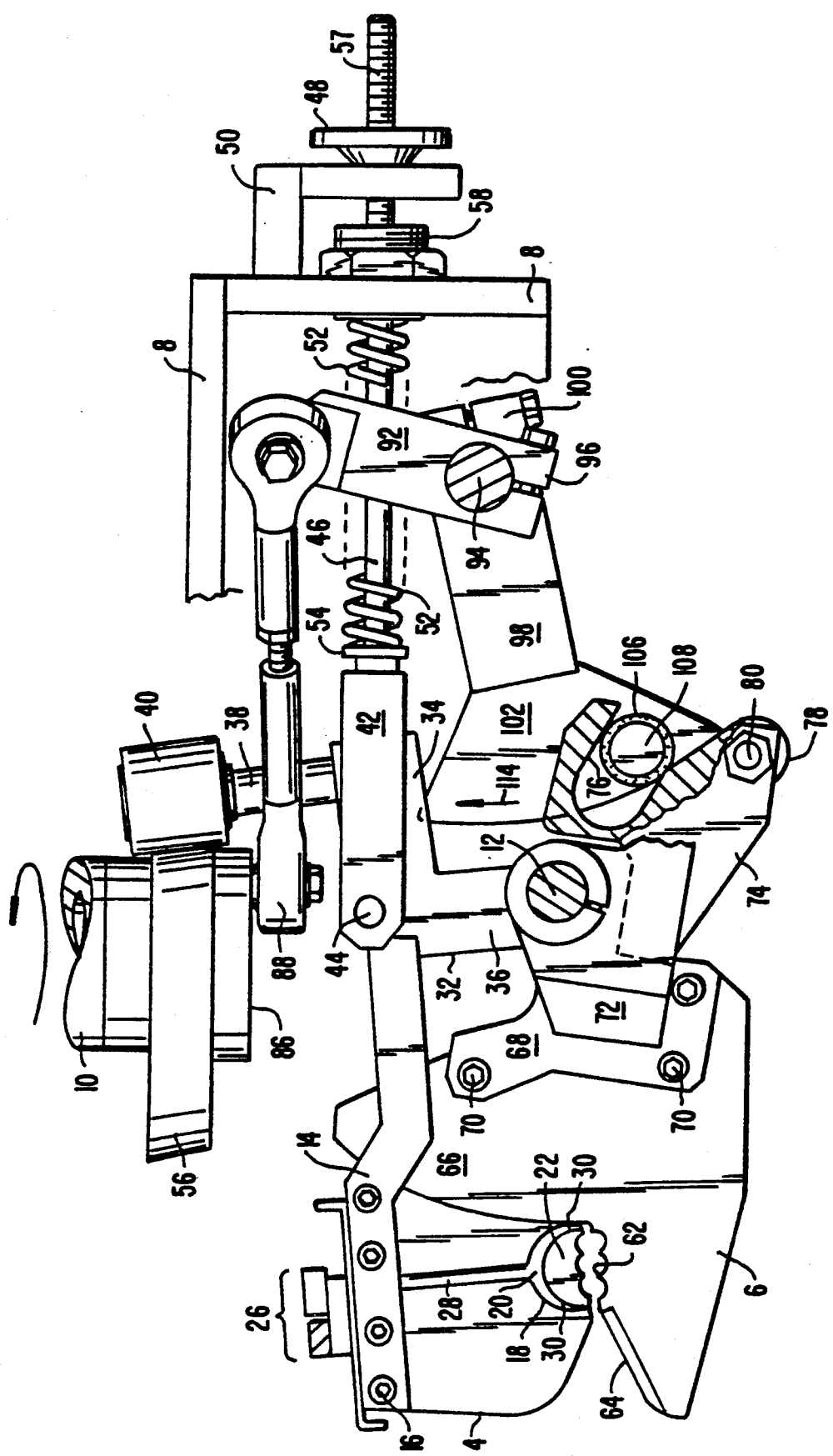
FIG. 3 is a side elevational view of the blade assembly of FIG. 1, illustrating the lower blade at the transition for opening with the drive roller of the lower blade drive arm engaging the drive roller track of the lower blade carriage.

Main shaft 10 includes bottom surface 86 (FIGS. 3, 4). Crank arm 88 is secured to bottom surface 86 at a position offset from the rotational axis of main shaft 10. The rotation to translation connection between crank arm 88 and main shaft 10 is accomplished by ball joint 90 or other suitable connection. Crank arm 88 extends from main shaft 10 to lower blade idler arm 92 and is pivotally connected thereto. Lower blade idler arm 92 is in turn connected to drive arm support shaft 94 with clamp 96.

Figure 2:
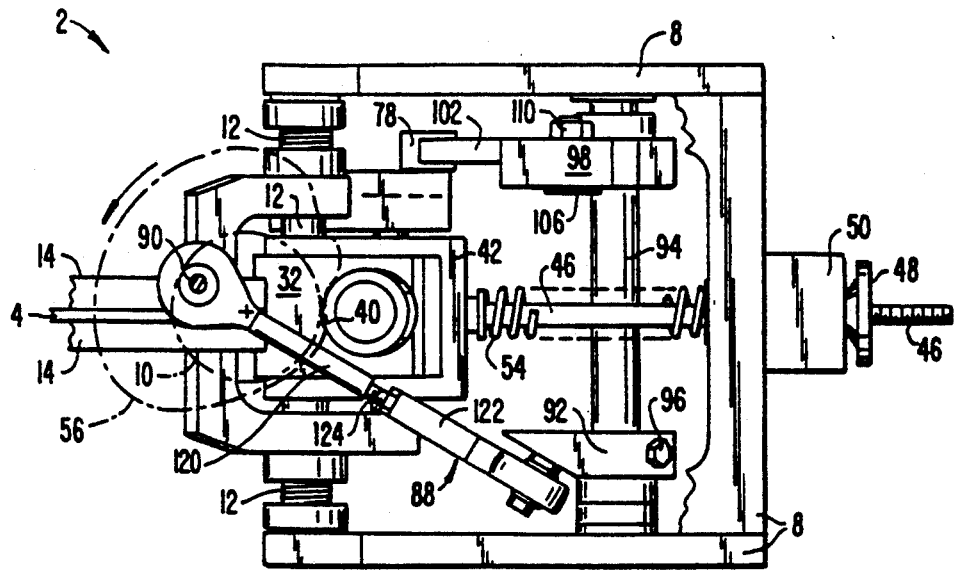
FIG. 2 is a top plan view of the blade assembly of FIG. 1 with the main shaft and upper blade cam shown in dot-dash lines.
Figure 5:
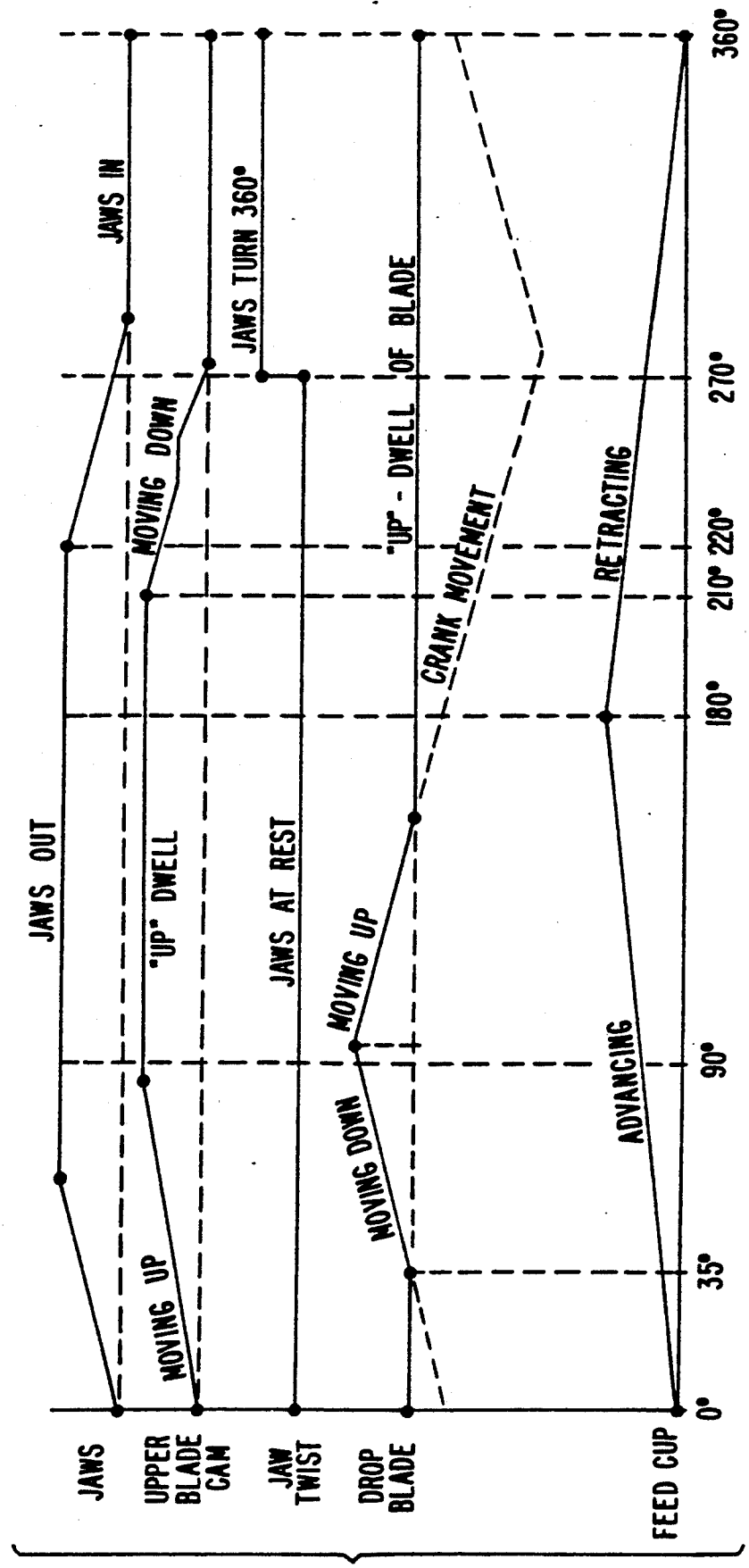
FIG. 5 is a timing diagram illustrating the various component movements of a typical selective pitter apparatus during a pitting cycle defined by one revolution of the main shaft.

Referring now to FIG. 2, a top plan view of blade assembly 2 is shown with main shaft 10 and cam 56 shown in dot-dash line. FIG. 2 provides an illustration of blade assembly 2 with the various components positioned having upper blade 4 and lower blade 6 in the closed condition. This position corresponds to 270° of rotation of mainshaft 10 (FIG. 5). As best seen in FIG. 2, lower blade idler arm 92 is clamped onto drive arm support shaft 94 extending generally transversely of the planes of upper blade 4 and lower blade 6 and supportably and rotationally mounted to frame 8 at either end. Lower blade idler arm 92 is clamped onto drive arm support shaft 94 near one end of the shaft. Near its other end lower blade drive arm 98 is secured to shaft 94 by a similar clamp 100 (FIGS. 3, 4). Lower blade drive arm includes drive head 102 having a semicircular rocker face 104 which engages rolling rocker face follower 78 (FIGS. 1, 3). A drive roller 106 is rotatably mounted onto a roller shaft 108 extending as a protrusion out from drive head 102. Roller shaft 108 is secured to drive head 102 in a removable fashion using bolt 110 (FIG. 2). Drive roller 106 is sized and positioned to be received in drive roller track 76. All pivot points throughout blade assembly 2 use appropriate bushings to minimize wear and eliminate lubrication requirements. As such, water and juice spray from normal pitting operations provide requisite lubricity even during high rate pitting operations over long runs.

In operation, blade assembly 2 is configured to undergo one pitting cycle per revolution of main shaft 10. During each pitting cycle, a peach is inserted into blade assembly 2, pitted, and allowed to drop away providing for introduction of a subsequent peach. FIG. 5 provides a timing diagram of the various components of a selective peach pitter adapted to benefit from blade assembly 2. The relative motion of the various component parts in blade assembly 2 can best be seen by comparing FIGS. 1, 3 and 4.

Referring first to FIG. 1, blade assembly 2 is shown having upper blade 4 and lower blade 6 in the closed position. For purposes of description, this position shall be described as an origin position with main shaft 10 at a reference of 0° of rotation (FIG. 5). As main shaft 10 rotates from this origin position, the rotation causes crank arm 88 to communicate translational force to idler arm 92. This motion forces idler arm 92 to pivot about drive arm support shaft 94 in a direction generally indicated by arrow 112 (FIG. 1). Because lower blade idler arm 92 is securely clamped to drive arm support shaft 94, support shaft 94 rotates with lower blade idler arm 92 causing lower blade drive arm 98 to rotate in the direction of arrow 114. As lower blade drive arm 98 rotates in this direction, semicircular rocker face 104 moves towards carriage 74 by riding upon rolling rocker face follower 78. The curved geometry of semicircular rocker face 104 places no pivoting force on carriage 74, thereby maintaining lower blade 6 in a closed or pit-gripping position during a predetermined portion of the cycle of operation (FIG. 5—"up" dwell.

As lower blade drive arm 98 continues to pivot in the direction of arrow 114, drive roller 106 engages guide roller track 76 as rolling rocker face leaves follower 78 (FIG. 3). Guide roller track 76 is configured so that at a predetermined point in a cycle of operation at approximately 35° of rotation of main shaft 10, pivoting motion of lower blade drive arm 98 is communicated to carriage 74 as drive roller 106 abuts the perimeter of guide roller track 76. FIG. 3 illustrates lower blade pivot linkage at the transition between lower blade 6 in the stationary closed or pit-gripping position, and pivoting downwardly to an open position. As drive roller 106 travels from the position illustrated in FIG. 3 to the position illustrated in FIG. 4, lower blade 6 is caused to pivot downwardly about blade pivot or support shaft 12. Drive head 102 continues to rotate upwardly towards main shaft 10.

Lower blade 6 is in the fully open position when main shaft 10 has rotated approximately 95°. At this juncture, continued rotation of main shaft 10 begins to pull on crank arm 88 rotating lower blade idler arm 92 and lower blade drive arm 98 in a counterclockwise direction (FIG. 4) and pivoting lower blade 6 back towards its closed position, by reverse operation of roller 106 in track 76 and rocker face 104 on follower 78. At 155° of rotation of main shaft 10, lower blade 6 is returned to its fully closed position (FIG. 1). This cycle is duplicated for each revolution of main shaft 10.

In the preferred embodiment, crank arm 88 includes two telescoping portions 120, 122 to allow adjustment of the effective length of crank arm 88. Portion 120 and portion 122 are preferably threadably connected at threads 124 to allow incremental length adjustment. By extending the length of crank arm 88, the relative position of lower blade idler arm 92 is advanced clockwise along its rotational axis (FIG. 3) thereby advancing the remaining lower blade pivot linkage proportionally. Adjusting the length of crank arm 88 changes the end positions of the arc of drive roller 106 about support shaft 94. The length of travel of drive roller 106 determines the maximum opening (lower position) of lower blade 6 when idler arm 92 is in the extreme right hand position (FIG. 4).

The longitudinal extent of crank arm 88 is adjusted to assure that the left hand tip of rocker face 104 is in the correct relationship to rocker face follower 78 at the beginning of a cycle (FIG. 1). When crank arm 88 is lengthened, rocker face 104 and drive roller 106 are adjusted in the direction of arrow 114 (FIG. 3) so that the end of movement of roller 106 is higher up and lower blade 6 is opened (lowered) more.

For best results, the total swinging movement of lower blade 4 around shaft 12 should be kept at a minimum to reduce wear on all moving parts of the lower blade assembly, and still have enough blade opening to allow proper discharge of the pitted peach halves.

The lower blade pivot linkage of blade assembly 2 can also be employed with upper blade pivot linkage of the prior art and still benefit from the unique benefits of the design.

During the same cycle, upper blade pivot linkage is also causing upper blade 4 to reposition itself. For purposes of description, the same reference points of main shaft 10 rotation shall be used to describe the linkage of the upper blade. Motion of the upper blade 4 is defined as a result of the size and shape of cam 56, shown in dot-dash line in FIG. 2. Cam 56 is shaped to cause cam roller follower 40 to displace along a plane generally parallel to the planes of the bisecting upper blade and lower blade assembly. As cam roller follower 40 displaces away from main shaft 10, driven by cam 56, this displacement causes upper blade 4 to pivot about blade pivot shaft 12. Because upper blade brace 42 is pivotally mounted to upper blade arm 32 at upper blade arm pivot 44 offset from the axis of rotation about blade pivot shaft 12, displacement of cam roller follower 40 away from main shaft 10 also displaces rod 46 through tension adjuster 58 against the biasing force of spring 52. Therefore, as can be seen from FIG. 4, as cam 56 drives cam roller follower 40 away from main shaft 10, rod 46 is forced through tension adjuster 58 separating position adjuster 48 from bracket 50.

From the origin position of main shaft 10 (0° rotation), upper blade 4 begins to rise from the closed position of FIG. 1 to the open position of FIG. 4. At approximately 85° of rotation of main shaft 10, upper blade 4 is pivoted into the maximum open position. Upper blade 4 remains in this position until approximately 210° of rotation where the outer shape of cam 56 changes to allow cam roller follower 40 to move closer to the axis of the rotation of main shaft 10 aided by the biasing force of spring 52 and thereby pivot upper blade 4 towards the closed position when position adjuster 48 makes contact with bracket 50. This motion is duplicated with each revolution of main shaft 10.

A primary feature of the invention is the reduction of pivot points from prior art designs and the particular geometry of the assembly provides for an ease of cleaning and maintenance.

To facilitate a full understanding of the interaction of blade assembly 2 with a typical selective peach pitter apparatus, it is important to understand the preferred overall operation of the selective pitter in its optimum configuration. FIG. 5 provides a timing diagram relating the various operational components of a typical selective peach pitter. This timing diagram is provided for illustrative purposes, it being understood that blade assembly 2 could be employed in apparatus having different timing and components. The "jaws" of a selective pitter apparatus are used to grasp peach halves and twist them as the pit is retained between the teeth or pit gripping portions 24 and 62 of blades 4 and 6. The term "feed cup" is used to describe the apparatus used to advance consecutive drupes or peaches into the space between the blades of the blade assembly 2. At 0° of rotation of main shaft 10, the previous pitting cycle has been completed and peach halves are torqued off of a pit retained between upper blade 4 and lower blade 6 in the closed position. At this time, upper blade 4 begins to rise releasing its grip on the pit and the jaws (not shown) open as they start to retract away from the pit thereby releasing the peach halves. At 35° of rotation, gripping pressure has been removed from the pit, and lower blade 6 drops allowing the pit to drop out of blade assembly 2. At 95° of rotation, upper blade 4 is in the fully open position and lower blade 6 rapidly returns to the closed position for arrival of the next peach approaching in the advancing feed cup. The peach is impaled on the lower and back blades at 180° of rotation and the pit is located in the center of jaw rotation by the jaws as upper blade 4 starts moving down at 210° rotation to force the pit against lower blade 6 in a pit gripping position. At 220° of rotation the jaws start advance toward the peach, and at 270° of rotation while the pit is firmly held between lower blade 6 and spade 22 of upper blade 4, the jaws have closed on the peach, the flesh of which has been bisected to the pit by the closing blade assembly. Between 270° of rotation and 360° of rotation of main shaft 10, the jaws grasp and torque off the peach halves from the gripped, stationary pit. The cycle is then complete and is repeated for the next consecutive peach.

Although a preferred embodiment of the invention has been described and discussed, it will become apparent to those skilled in the art that by employing the invention, variations and modifications can be made in light of the above teaching without deviating from the spirit and scope of the invention. The preferred embodiment described above is not intended to be exhaustive or to limit the invention to the precise form disclosed. Rather, the preferred embodiment described was selected to best explain the principles and its practical application to thereby enable others skilled in the art to best utilize the invention as suited to the particular purpose contemplated. Furthermore, the linkage of lower blade 6 could be employed independently with upper blade designs in the prior art. Additionally, various components can be combined into integral structures if required to reduce the number of component parts in the assembly. The preferred embodiment, however, provides several convenient, removable components for facilitating simplified cleaning and maintenance. Furthermore, various substitutions can be made, such as substitution of bearing for bushings, resilient cushions substituted for coil springs, etc. It is intended that the scope of the invention be defined by the claims appended hereto.

What is claimed is:

1. A blade assembly for a drupe pitter, the drupe pitter having a main shaft and a frame, the blade assembly comprising:

a support shaft coupled to the frame;

an upper blade and a lower blade positioned in a common plane, the upper blade pivotally coupled to the support shaft and movable between a first position and a second position in said plane, the lower blade coupled to the support shaft and movable between a third position and a fourth position in the suture plane, wherein when the upper blade and the lower blade are in the first position and the third position respectively, the blade assembly is in an open position and when the upper blade and the lower blade are in the second position and the fourth position respectively, the blade assembly is in a pit gripping position;

means for pivoting the upper blade about the support shaft in a reciprocating manner, the upper blade pivoting means coupled to and driven by said main shaft;

means for pivoting the lower blade about the support shaft in a cyclic manner, the lower blade pivoting means including a carriage coupled to the lower blade, a lower blade drive arm, and crank arm coupled to the main shaft and coupled to said lower blade drive arm, means on said drive arm for maintaining said lower blade in said fourth position during a predetermined portion of a cycle of operation.

2. The blade assembly of claims 1 including:

means on said drive arm engageable with said carriage for pivoting said lower blade from said fourth position to said third position after said predetermined portion of said cycle.

3. The blade assembly of claim 2 wherein said crank arm is adjustable to length and adjustment thereof limits the amount of movement of said lower blade between said third and fourth positions.

4. The blade assembly of claim 1 wherein the main shaft includes an axis of rotation and is coupled to the crank arm at a rotational mount offset from the axis of rotation of the main shaft.

5. The blade assembly of claim 4 wherein the upper blade pivoting means includes a cam connected to the main shaft, a cam follower coupled to the upper blade and means for biasing the cam follower against the cam, the cam displacing the cam follower along a displacement plane generally parallel to said suture plane as the main shaft rotates, the displacement communicated to the upper blade to pivot said upper blade about the support shaft.

6. The blade assembly of claim 5 wherein the cam follower biasing means includes a resilient member and means for adjusting tension on said resilient member.

7. The blade assembly of claim 1 further comprising a lower blade idler arm rotatably coupled to said crank arm and drivingly coupled to said lower blade drive arm.

8. The blade assembly of claim 7 further comprising a drive arm support shaft having a first end and a second end, an idler arm pivotally coupled to the crank arm and connected to the drive arm support shaft near the first end, and the lower blade drive arm connected to the lower blade drive arm support shaft near the second end.

9. The blade assembly of claim 8 wherein the idler arm includes a releasable clamping member for adjustably connecting said idler arm to said drive arm support shaft.

10. The blade assembly of claim 8 wherein the lower blade drive arm includes a releasable clamping member for adjustably connecting said lower blade drive arm to said drive arm support shaft.

11. The blade assembly of claim 1 wherein the upper blade pivoting means and the lower blade pivoting means are configured to perform a cycle with each revolution of the main shaft, the cycle having an origin at zero degrees of rotation of the main shaft and an end defined at three hundred and sixty degrees of rotation of the main shaft, wherein at about zero degrees of rotation the upper blade begins to move from the second position to the first position; at about thirty-five degrees of rotation the lower blade begins to move from the fourth position to the third position; at about ninety-five degrees the lower blade begins to rapidly move from the third position towards the fourth position and the upper blade remains generally stationary; and at about two-hundred ten degrees the upper blade begins to move from the first position to the second position.

12. A lower blade assembly for a drupe pitter, the drupe pitter having a main shaft and a frame, the lower blade assembly comprising:

a lower blade;

a support shaft coupled to the frame;

means for swingingly supporting said lower blade on said support shaft for movement between open and closed positions;

lower blade pivot linkage coupled to and driven by the main shaft, the lower blade pivot linkage including an extendable crank arm having a length and coupled to the main shaft, a drive arm support shaft having a first end and a second end, an idler arm coupled to the crank arm and connected to the drive arm support shaft near the first end, a lower blade drive arm connected to the lower blade drive arm support shaft near the second end, and a carriage coupled to the lower blade;

means on said drive arm engageable with said carriage for maintaining said lower blade in said closed position during a predetermined portion of a cycle of operation.

* * * * *